June 30, 1970  M. E. GRANTHAM  3,518,029
FLUID PUMP

Filed July 5, 1968                    2 Sheets-Sheet 1

INVENTOR:
MAX EDWARD GRANTHAM
by Mason, Kolehmainen, Rathburn & Wyss
ATTYS

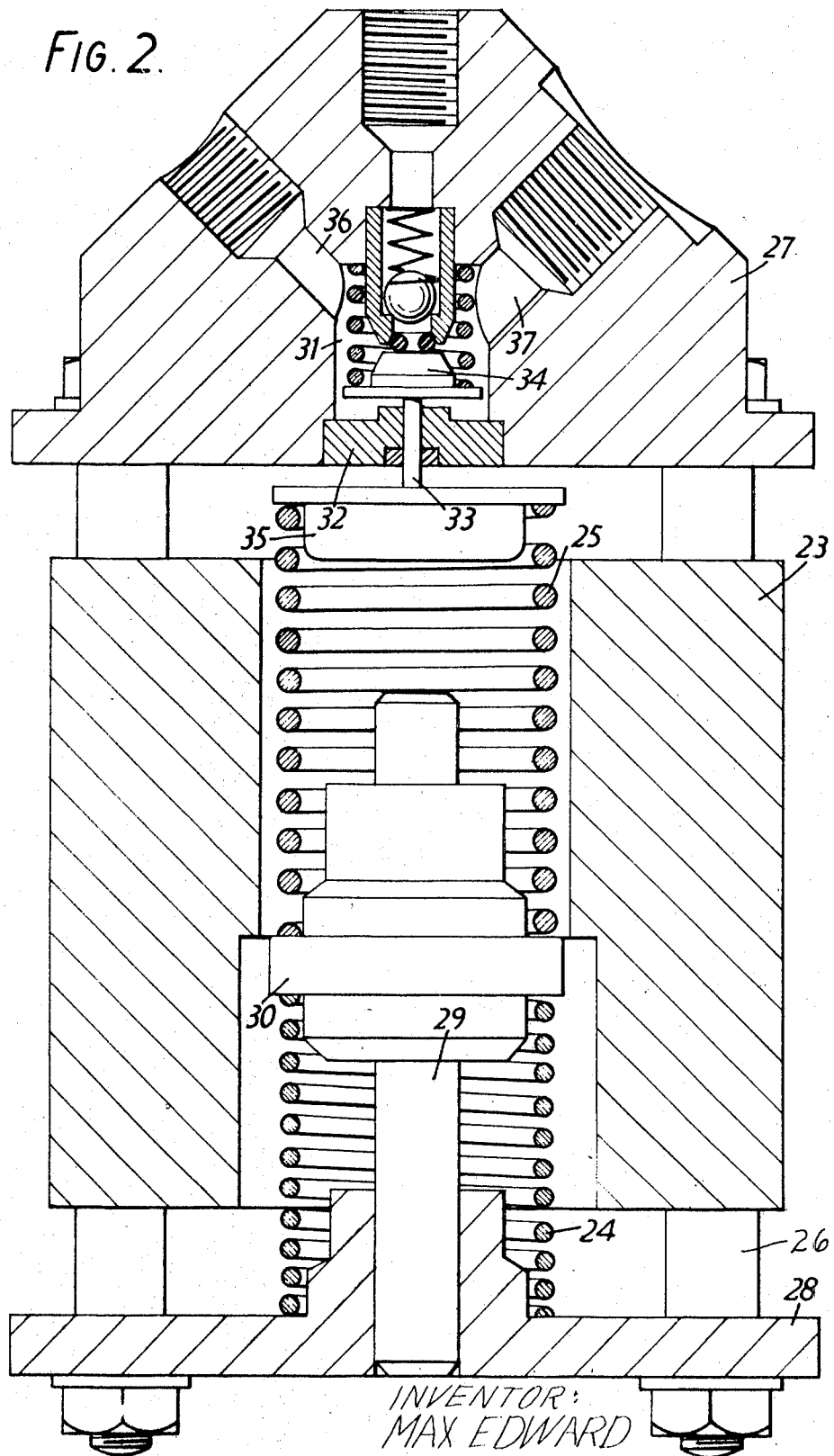

United States Patent Office 3,518,029
Patented June 30, 1970

---

3,518,029
FLUID PUMP
Max Edward Grantham, Plymouth, Devon, England, assignor to Tecalemit (Engineering) Limited, Plymouth, Devon, England
Filed July 5, 1968, Ser. No. 742,638
Claims priority, application Great Britain, July 5, 1967, 30,899/67
Int. Cl. F04b *17/00, 9/02, 9/06*
U.S. Cl. 417—211                                    13 Claims

ABSTRACT OF THE DISCLOSURE

A fluid pump has a freely suspended mass which reciprocates relative to a pump as the object on which it is mounted moves. The pump of the invention is particularly suitable for trailer lubrication. The movement of the mass will continue under inertia so that lubrication may occur without external power being supplied as the trailer is towed. A pump part is moved to the mass to compress a deformable element and force fluid through a non-return valve. Separation of the part from the element allows fluid to flow into the volume within the element.

---

Figure 1:
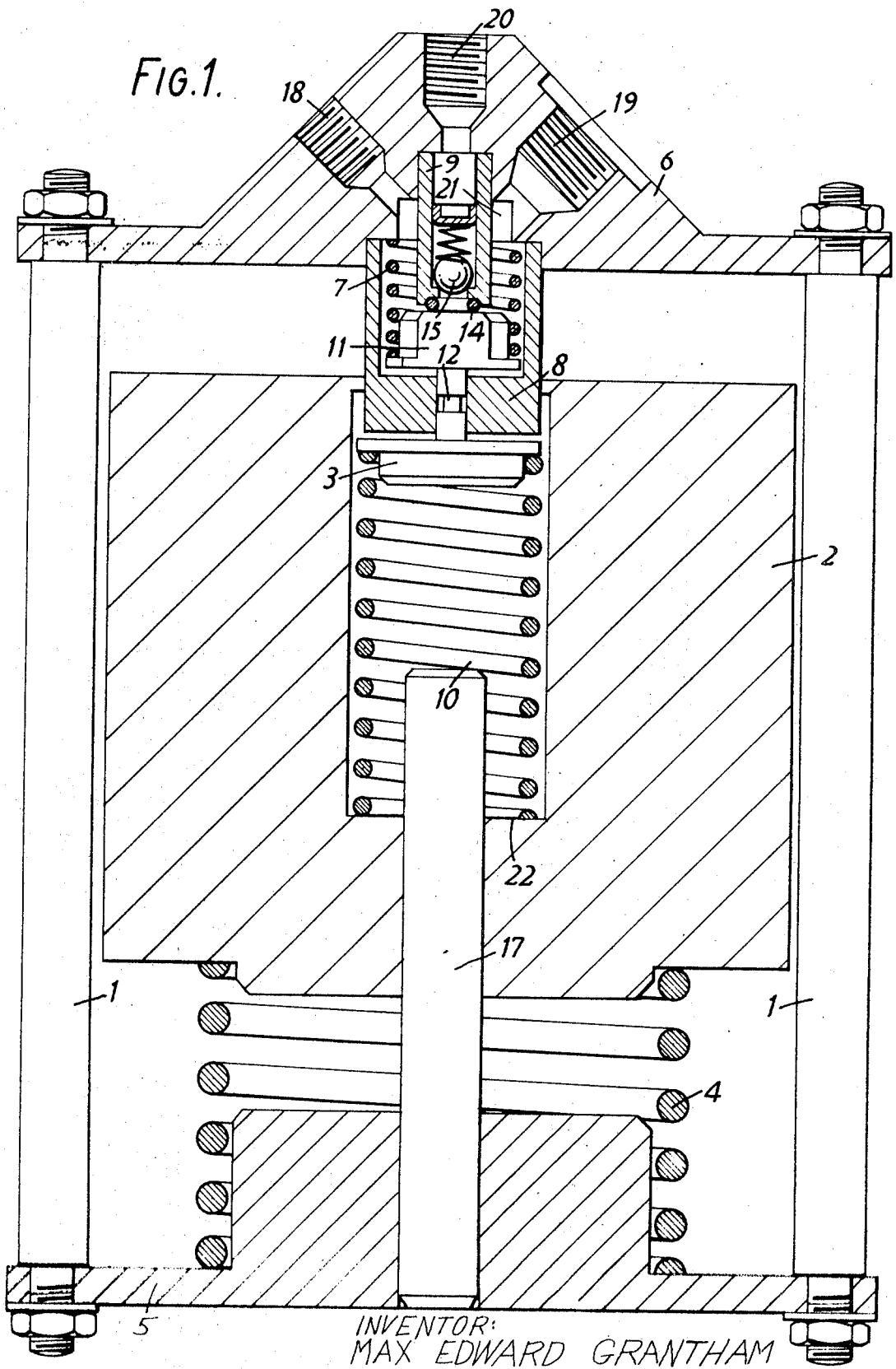

This invention relates to fluid pumps and is of particular but not exclusive utility in lubrication systems.

The pump according to the invention may be an independently acting device and is of use where a lubrication system is required which operates without the necessity of external power supply. Such a system is used when it is desired to lubricate a vehicle such as a trailer. The pump according to the invention allows the movement of lubricating fluid from a reservoir to the lubricating points without the necessity of supplying power from an external point to the trailer.

The invention provides a fluid pump comprising a pump body movable towards the open end of a deformable element around a pump volume so that a quantity of fluid is moved from the pump volume through a non-return valve as the pump body closes the open end and continues its movement to compress the deformable body, and a body recipirocable with one degree of freedom relative to the element and connected to the pump body.

The reciprocable body is moved by relative movement of the trailer to which is attached the main body of the pump. Thus the freely suspended reciprocable body moving relative to the trailer operates the pump independently. The pump may also be used on machinery where a part is movable so that in this application the reciprocable body moves relative to the moving part along its one degree of freedom. Alternatively, this body may be oscillated by electromagnetic means using for example mains electricity. Preferably, the reciprocable body is resiliently connected to the pump body so that excessive movement of the reciprocable body does not cause damage to the actual pump parts. The formal element may be in the form of a ring which is compressed by the pump body.

The pump may be produced with a small size and after the recipirocable body has been given an initial displacement, the pump may continue for a considerable time until the inertia has been lost.

Compression of the deformable element may be limited by a stop member which co-operates with a part of the pump movable towards the element. Preferably, this stop member co-operates with the pump body and may be the rim of the bore adjacent the deformable element.

The invention allows the construction of pumps which provide a substantially time dependent flow of lubricant or other fluid and the flow is not dependent on the amplitude of oscillation of the freely suspended reciprocable body. Thus, excessive movement of this body is absorbed by its resilient supports.

Two embodiments of the pump according to the invention will now be described by way of example with reference to the accompanying diagrammatic drawings in which:

FIG. 1 is an axial section of one embodiment; and
FIG. 2 is an axial section of another embodiment.

A base plate 5 which is a flanged cylinder having a central bore is connected in spaced relationship to a front plate 6 which is of flanged conical shape. The plates are connected together and spaced apart by a series of spacing rods 1 which are positioned at the edges of the flanges. A first helical spring 4 is positioned around the cylinder of the base plate 5 and resiliently supports a movable reciprocable body 2 which is cup shaped and has a large mass. The body is constrained to oscillate along its longitudinal axis and is slidable on a guide rod 17 which is retained in the central bore of the back plate 5.

Within the body 2 there is positioned a second helical spring 10 which abuts an annular surface 22 of the body 2. The other end of the helical spring abuts the peripheral flange of a plate 3 so that movement of the body 2 is transmitted to the plate 3 through the spring 10. Thus the body 2 and plate 3, which is the intermediate body, are resiliently connected. A pump housing 8 which is of cup shaped form and has a central bore in the closed end is disposed with its open end position in a recess in the front plate 6. A pump body 11 consisting of a flanged disc is positioned within the pump housing and is connected with the plate 3 via a rigid push rod 12 which extends through the central bore of the housing 8 and is in liquid tight contact therewith. The pump body 11 is biassed from the front plate 6 by a helical return spring 7 which contacts the flange of the pump body 11 and a surface of the front plate 6 in the recess containing the pump housing.

A valve housing 9 of cylindrical form contains a non-return valve 15 and is positioned in a recess in the front plate 6 and extends coaxially with and partially within the pump housing 8. A resilient O-ring 14 is positioned in an annular recess in the end of the valve housing 9 which extends to the pump housing. This O-ring stands proud of the end surface of the valve housing and contacts a surface of the pump body 11 when the pump is at rest.

An input port 18 is formed in the conical part of the front plate 6 and connects with a pump space 21 within the pump housing 8. An output port 20 connects the non-return valve with the system to which liquid is to be supplied. Another input port 19 is provided in the front plate 6.

In operation the body 2 moves along the guide rod 17 and oscillates about its rest position. As the body 2 moves away from the valve the pump body 11 is moved out of contact with the O-ring 14 due to the energy stored in the return spring 7. Liquid then flows from the space 21 between the pump body 11 and the O-ring 14 and then into the pump volume which is the space within the O-ring immediately adjacent the non-return valve.

Movement of the body 2 towards the front plate 6 compresses the spring 10. The movement is transmitted to the plate 3 through spring 10 and then to the pump body 11 through the pushrod 12. The pump body 11 moves so as to compress the return spring 7 and contacts the O-ring 14. The forces opposing the continued movement of the pump plate 11 at this position are the return spring 7, the resilience of the O-ring and the liquid back pressure. When the pump plate moves to compress and deform the O-ring liquid passes from the pump volume through the non-return valve and out through the port 20.

The pump body continues to compress the O-ring until the body surface contacts the end of the valve housing 9 preventing further movement. Any movement of the body 2 after this time is absorbed in the second spring 10. Thus, the pump delivers a fixed volume of liquid independent of the amplitude of oscillation of the body 2. This fixed volume is the volume swept out by the pump body surface between the position where it contacts the O-ring and the position where it contacts the end of the valve housing 9 and has its movement limited thereby.

The pump thus delivers a volume which does not depend on the amplitude of the body oscillation but is substantially time proportional.

The pump can be prepared to be selfpriming by selection of the dimensions of the pump.

The embodiment shown in FIG. 2 has a similar pumping operation to the embodiment of FIG. 1 and has a comparable structure. A reciprocable body 23 of large mass is resiliently supported by helical springs 24, 25 within support rods 26. Front and base plates 27 and 28 are provided and the body 23 is slidable on guide rod 29. It will be noted that the body 23 has a shape different from that of body 2 of the first embodiment. The spring 24 extends into the body 23 and both support springs contact a flange 30 rigidly connected to body 23.

Pump space 31 in this embodiment is formed within the front plate 27 (compare pump space 21 in FIG. 1) and is closed by a closure plate 32. A rigid push rod 33 extends through this plate in fluid tight sealing and connects the pump body 34 and intermediate body plate 35. Two input ports 36, 37 are provided.

The pump of the invention may be used to mix fluids by providing two input ports and connecting them to supplies of different fluids. Alternatively, as is shown in the two embodiments described, the two input ports may have different diameters so that the pump is usable with connectors of different size. Thus a connector is attached to one input port and the other port is blanked off by a suitable plug.

What I claim is:
1. A fluid pump comprising:
an open ended pump chamber;
a peripheral deformable element terminating said pump chamber;
a pump body separable from the deformable element and movable towards said element to compress same;
a non-return valve communicating with said pump chamber; and
an inertial body reciprocable with one degree of freedom relative to said element and connected to said pump body.
2. A fluid pump as claimed in claim 1 including a resilient connection between the pump body and the reciprocable body.
3. A fluid pump as claimed in claim 1 wherein the deformable element is ring-shaped.
4. A fluid pump as claimed in claim 1 wherein the non-return valve is positioned within a cylindrical pump chamber.
5. A fluid pump as claimed in claim 2 including a stop member which cooperates with the pump body after compression of the deformable element.
6. A fluid pump as claimed in claim 1 including a pump housing, within which are positioned the pump body and deformable element, and an inlet port in said housing.
7. A fluid pump as claimed in claim 2 including an intermediate body rigidly connected to the pump body, said resilient connection contacting the reciprocable body and the intermediate body.
8. A fluid pump as claimed in claim 2 wherein said resilient connection is a compressable spring.
9. A fluid pump as claimed in claim 1 including biassing means biassing said pump body from said deformable element.
10. An inertia pump providing a substantially time dependent flow of fluid independent of the amplitude of operation thereof and comprising:
a pump chamber having a bore extending therethrough;
a peripheral deformable element terminating said pump chamber;
a pump body separable from said deformable element and movable towards said element to compress the same;
outlet means;
a non-return valve communicating between said pump chamber through said element and said outlet means;
inlet means communicating with said pump chamber;
an inertial body reciprocable relative to said chamber; and
connecting means extending through said bore operatively interconnecting said inertial body and said pump body.
11. An inertia pump as claimed in claim 10 wherein a first compression spring supports said inertial body and said connecting means includes a second compression spring interconnecting said inertial body and a pump rod connected to said pump body whereby lost motion is provided between said inertial body and said pump body to provide substantially uniform movement of said pump body substantially independent of the amplitude of movement of said inertial body.
12. An inertia pump as set forth in claim 11 including resilient means in said pump chamber biassing said pump body apart from said deformable element during oscillation of said inertial body.
13. An inertia pump providing a substantially time dependent flow of fluid independent of the amplitude of operation thereof and comprising:
a fluid pump including a pump body having a substantially fixed amplitude of operation;
an inertial body reciprocable relative to said pump;
first compression spring means supporting said inertial body; and
connecting means including a second compression spring interconnecting said inertial body and said pump body whereby lost motion is provided between said inertial body and said pump body to provide substantially uniform amplitude of movement of said pump body substantially independently of the amplitude of movement of said inertial body.

References Cited

UNITED STATES PATENTS

| | | | |
|---|---|---|---|
| 1,703,983 | 3/1929 | Braselton et al. | |
| 1,742,183 | 1/1930 | Bell | 103—28 |
| 2,929,332 | 3/1960 | Pierce | 103—148 |
| 3,205,826 | 9/1965 | DeStefani | 103—53 |

ROBERT M. WALKER, Primary Examiner

U.S. Cl. X.R.

92—95, 161; 417—479, 520